United States Patent
Takahashi (10) Patent No.: US 7,849,417 B2
(45) Date of Patent: Dec. 7, 2010

(54) IMAGE DISPLAY SYSTEM, IMAGE DISPLAY METHOD AND IMAGE DISPLAY PROGRAM

(75) Inventor: Susumu Takahashi, Tokyo (JP)

(73) Assignee: Kamatsu Ltd., Tokyo (JP)

( * ) Notice: Subject to any disclaimer, the term of this patent is extended or adjusted under 35 U.S.C. 154(b) by 255 days.

(21) Appl. No.: 11/239,415

(22) Filed: Sep. 29, 2005

(65) Prior Publication Data

US 2006/0066510 A1 Mar. 30, 2006

(30) Foreign Application Priority Data

Sep. 30, 2004 (JP) ............................. 2004-286665

(51) Int. Cl.
G06F 3/048 (2006.01)
G06Q 30/00 (2006.01)

(52) U.S. Cl. ...................... 715/776; 715/764; 715/810; 705/26; 705/27

(58) Field of Classification Search ................. 715/776, 715/764, 810; 705/26, 27; 345/752, 753, 345/754
See application file for complete search history.

(56) References Cited

U.S. PATENT DOCUMENTS

| | | | | |
|---|---|---|---|---|
| 5,890,175 | A * | 3/1999 | Wong et al. ................. | 715/236 |
| 6,167,382 | A * | 12/2000 | Sparks et al. ................. | 705/26 |
| 6,249,773 | B1 * | 6/2001 | Allard et al. .................. | 705/26 |
| 6,441,811 | B1 * | 8/2002 | Sawada et al. .............. | 345/204 |
| 6,564,225 | B1 * | 5/2003 | Brogliatti et al. ......... | 707/104.1 |
| 6,901,379 | B1 * | 5/2005 | Balter et al. .................. | 705/27 |
| 7,017,189 | B1 * | 3/2006 | DeMello et al. ................ | 726/26 |
| 7,081,882 | B2 * | 7/2006 | Sowden et al. .............. | 345/156 |
| 7,225,148 | B2 * | 5/2007 | Kassan ......................... | 705/26 |
| 7,283,129 | B1 * | 10/2007 | Sawada et al. .............. | 345/204 |
| 7,287,003 | B2 * | 10/2007 | Hodson et al. ................ | 705/26 |
| 7,373,321 | B2 * | 5/2008 | Collings et al. ............... | 705/35 |
| 7,386,804 | B2 * | 6/2008 | Ho et al. ...................... | 715/776 |

(Continued)

FOREIGN PATENT DOCUMENTS

JP 2001-344279 A 12/2001

(Continued)

OTHER PUBLICATIONS

Peter Bargh, PhotoShop A to Z, 2001, Focal Press, p. 113.*

(Continued)

*Primary Examiner*—Simon Ke
*Assistant Examiner*—Erik V Stitt
(74) *Attorney, Agent, or Firm*—Holtz, Holtz, Goodman & Chick, PC (57) ABSTRACT

An image display system includes a server having a first image database that stores a first image having a first file format for movable image display; a second image database that stores a second image having the same display contents as the first image and a second file format for static image display; and an image distributor for distributing, in response to an image display request from a user terminal, the first and second images corresponding to the request. The user terminal has a movable image display unit for movably displaying the first image from the server; a static image display unit for statically displaying the second image; and a switch for switching the movable image display unit and the static image display unit.

11 Claims, 11 Drawing Sheets

U.S. PATENT DOCUMENTS

| | | | |
|---|---|---|---|
| 7,502,036 B2* | 3/2009 | Kramer et al. | 345/629 |
| 2002/0052806 A1* | 5/2002 | Hodson et al. | 705/27 |
| 2002/0115176 A1* | 8/2002 | Lanfear et al. | 435/196 |
| 2002/0152215 A1* | 10/2002 | Clark et al. | 707/10 |
| 2002/0184189 A1* | 12/2002 | Hay et al. | 707/1 |
| 2003/0130910 A1* | 7/2003 | Pickover et al. | 705/27 |
| 2005/0144093 A1* | 6/2005 | Kassan | 705/27 |
| 2006/0242027 A1* | 10/2006 | Falic | 705/26 |
| 2007/0150368 A1* | 6/2007 | Arora et al. | 705/26 |

FOREIGN PATENT DOCUMENTS

| | | |
|---|---|---|
| JP | 2002-133291 A | 5/2002 |
| JP | 2002-328951 A | 11/2002 |
| JP | 2004-104360 A | 4/2004 |
| JP | 2004-110719 A | 4/2004 |

OTHER PUBLICATIONS

Luke Welling, Laura Thomson, PHP and MySQL Web Development, Third Edition, Sep. 29, 2004, pp. 1-4.*

A partial translation of MAEDA, Jun, "Survey: Electronic Document Distribution Tool", Nikkei Internet Solutions, Japan, Nikkei Business Publications Inc., Nov. 22, 2003, No. 77, pp. 114-119.

A partial translation of "DjVu technology utilization example", Nikkei Computer, Japan, Nikkei Business Publications Inc., Dec. 16, 2002, No. 563, pp. 144-145.

A Japanese Office Action (and English translation thereof) dated Jun. 3, 2008, issued in a counterpart Japanese Application.

* cited by examiner

IMAGE DISPLAY SYSTEM, IMAGE DISPLAY METHOD AND IMAGE DISPLAY PROGRAM

BACKGROUND OF THE INVENTION

1. Field of the Invention

The present invention relates to an image display system, an image display method and an image display program.

2. Description of Related Art

Conventionally, there has been known an image display system for online shopping using the Internet, where images of a plurality of articles distributed by a web server are thumb-nailed as an electronic catalogue on a display of a user terminal, and when a user selects a desired article on the display, a zoomed image and detailed information of the desired article are distributed by the server and displayed (Reference: No. JP-A-2002-133291). Such image display system is generally used in a server providing contents for the Internet and in a user terminal including a web browser in various ways without limiting to the online shopping. Since only an image requested from the user terminal is distributed from the server, data amount is not too large, which is displayed on the user terminal without causing a stressful situation.

As another example, there has been also known an image display system in which images are displayed in a form of a book or a pamphlet on a display of a user terminal, as typified by an electronic book, the system having a page turning function for a virtual page turning operation. In such image display system, images of a book to be displayed are downloaded from a server through the Internet and stored in a storage of the user terminal, and the images are movably displayed so as to be page-turnable using a plug-in software installed in the user terminal. Example of the book includes a bound article catalogue in addition to a normal reading book consisting mostly of characters. The image display system allows users to enjoy a sense of actually reading a book or leafing through a catalogue, gaining favor of the users.

However, since data amount of the images used in an electronic book is huge, it takes long time to download the images, which is stressful for the users. Even in the system disclosed in the above Reference, when a thumbnail image is selected to request distribution of a zoomed image from the web server, it takes some time for the zoomed image to be distributed, so that the zoomed image is not always displayed smoothly.

In the electronic book, although the downloaded image can be zoomed in on the user terminal by a function of the plug-in software, unlike the system disclosed in the above Reference, a clear zoomed image is not distributed separately from the thumbnail image, but the downloaded image having been viewed is simply zoomed in. Thus, image quality of the zoomed image might be degraded significantly depending on magnification or file format (compression format) of the image data.

SUMMARY OF THE INVENTION

An object of the present invention is to provide an image display system, an image display method and an image display program capable of displaying an image without causing a stress to a user even when data amount of the image is large and securely preventing degradation of image quality.

An image display system according to an aspect of the present invention includes: a server; and a terminal connected to the server through a computer network, the server including: a first image database that stores a first image; a second image database that stores a second image having display contents same as the first image and a file format different from the first image; and an image distributor that, in response to an image display request from the terminal at one time, reads the first and second images corresponding to the request from the first and second data bases to distribute the read images, while the terminal including: a movable image display unit for movably displaying the first image distributed from the server; a static image display unit for statically displaying the second image distributed from the server; and a switch for switching the movable image display unit and the static image display unit, in which the server or the terminal includes a next image distributor for determining a next image that is expected to be displayed subsequently to the first and second images for the image display request and for outputting a command signal so that at least a first image of the next image is distributed with the first and second images for the image display request.

According to the aspect of the invention, the first and second images each are an image of, for instance, a center spread of a book. Although the first and second images show a common spread, file formats (compression format) of image data of the images are totally different. Specifically, the first image has a file format for a movable image display, which focuses on a page-turning function and the like, while the second image has a file format for static image display, which focuses on zoom display so that degradation of image quality is small even when the image is zoomed in. According to the aspect of the invention, when the terminal outputs to the server a display request for a center spread including a predetermined page, the server distributes first and second images of the requested center spread and further distributes at least a first image of a center spread that is expected to be requested subsequently as the next image.

Therefore, with the arrangement, the terminal does not download all movably displayable image data for a book from the server at one time, but the server only distributes the first and second images for the center spread and the next image as requested, so that the data amount transmitted at one time is very small, causing no stress to the user in distribution of the image. Further, as for the first image that is movably displayed with the data amount being larger than the second image, since the first image of the next image is distributed simultaneously with the requested image, by storing the next image in a flash memory or the like of the terminal, a quick response can be achieved for a display request of the next center spread, providing further smooth image display.

Since the first image as movably displayable image and the second image as statically displayable image are distributed and switched as required, the first image can be displayed when the user desires to turn the page, while the second image can be displayed when the user desires to zoom in the image. Thus, unlike related arts, an image on which the page-turning function is executed does not have to be zoomed in, so that degradation of image quality of image can be securely prevented when the image is zoomed in, allowing a clear zoomed window to be displayed.

In the image display system according to the present invention, it is preferable that the next image distributor distributes both the first and second images of the next image.

According to the aspect of the invention, the second image of the expected next image can be distributed as well as the first image, achieving even more quick response to the display request.

In the image display system according to the present invention, it is preferable that: the first and second images show an electronic catalogue; and the server includes an article purchase unit for encouraging a purchase of an article selected from the first and second images on the terminal.

With the arrangement having the article purchase unit, an article can be easily purchased by selecting the article from images of the electronic catalogue, realizing online shopping.

An image display method according to another aspect of the present invention for, using an image display system including a server and a terminal connected to the server through a computer network, displaying an image distributed from the server on the terminal, includes a server process and a terminal process, the server process including distributing both a stored first image and a second image having display contents same as the first image and stored in a file format different from the first image in response to an image display request from the terminal at one time, and the terminal process including: movably displaying the first image distributed from the server on the terminal; statically displaying the second image distributed from the server on the terminal; and switching the movable image display and the static image display, in which the server or the terminal determines a next image that is expected to be displayed subsequently to the first and second images for the image display request and outputs a command signal so that at least a first image of the next image is distributed with the first and second images for the image display request.

According to the aspect of the invention, the same advantage as that of the display image system described above can be achieved.

An image display program according to another aspect of the present invention for, using an image display system including a server and a terminal connected to the server through a computer network, displaying an image distributed from the server on the terminal, operates the server to function as: a first image database that stores the first image; a second image database that stores a second image having display contents same as the first image and a file format different from the first image; and an image distributor that, in response to an image display request from the terminal at one time, reads the first and second images corresponding to the request from the first and second image databases to distribute the read images, while the program operates the terminal to function as: a movable image display unit for movably displaying the first image distributed from the server; a static image display unit for statically displaying the second image distributed from the server; and a switch for switching the movable image display unit and the static image display unit, and the program further operates the server or the terminal to function as a next image distributor for determining a next image that is expected to be displayed subsequently to the first and second images for the image display request and for outputting a command signal so that at least a first image of the next image is distributed with the first and second images for the image display request.

According to the aspect of the invention, the same advantage as that of the display image system described above can be achieved.

DETAILED DESCRIPTION OF PREFERRED EMBODIMENT(S)

An embodiment of the present invention will be described with reference to the attached drawings.

Figure 1:
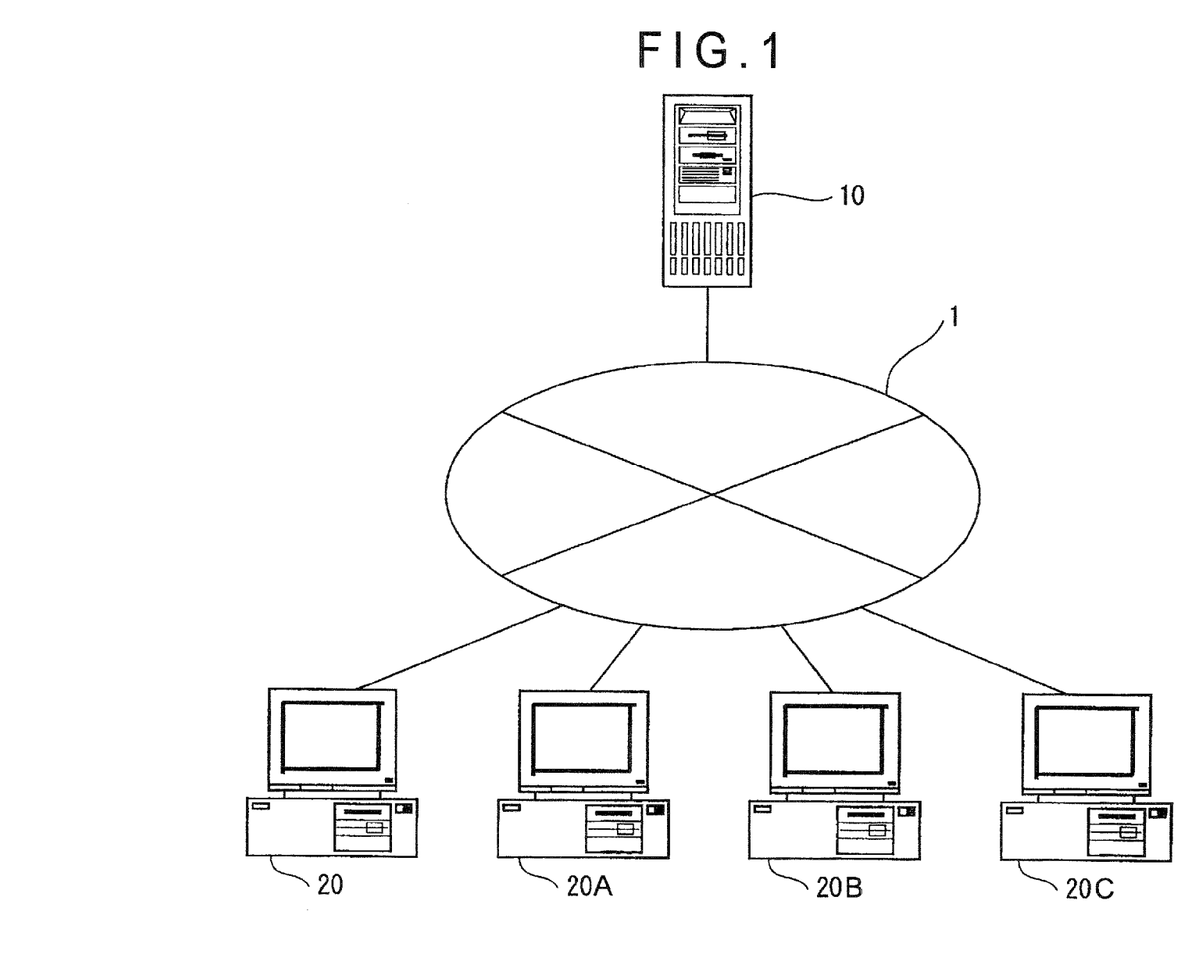
FIG. 1 is a diagram schematically showing an environment in which an image display system according to the present embodiment is applied.

FIG. 1 is a diagram schematically showing an environment in which an image display system according to the present embodiment is applied.

In FIG. 1, the image display system is used in a web server (server) 10 and a plurality of user terminals (terminal) 20, 20A, 20B, 20C connected through the Internet (network) 1, the system displaying on each user terminal 20, 20A, 20B, 20C an electronic catalogue 30 (FIG. 4) distributed from the web server 10 by a contents provider. The distributed electronic catalogue 30 has a form of a bound pamphlet, which is constituted by images of center spreads including right and left pages. With the arrangement, a user can view the electronic catalogue 30 just like leafing through a real bound catalogue.

[System Arrangement]

The web server 10 is constituted by a computer executing transmission of information and software having an information transmission function in the WWW (World Wide Web) system, and the web server 10 releases a website for online shopping in the present embodiment. The electronic catalogue 30 described above is used in the website for online shopping, and the image display system of the present invention is used for displaying the electronic catalogue 30.

Figure 2:
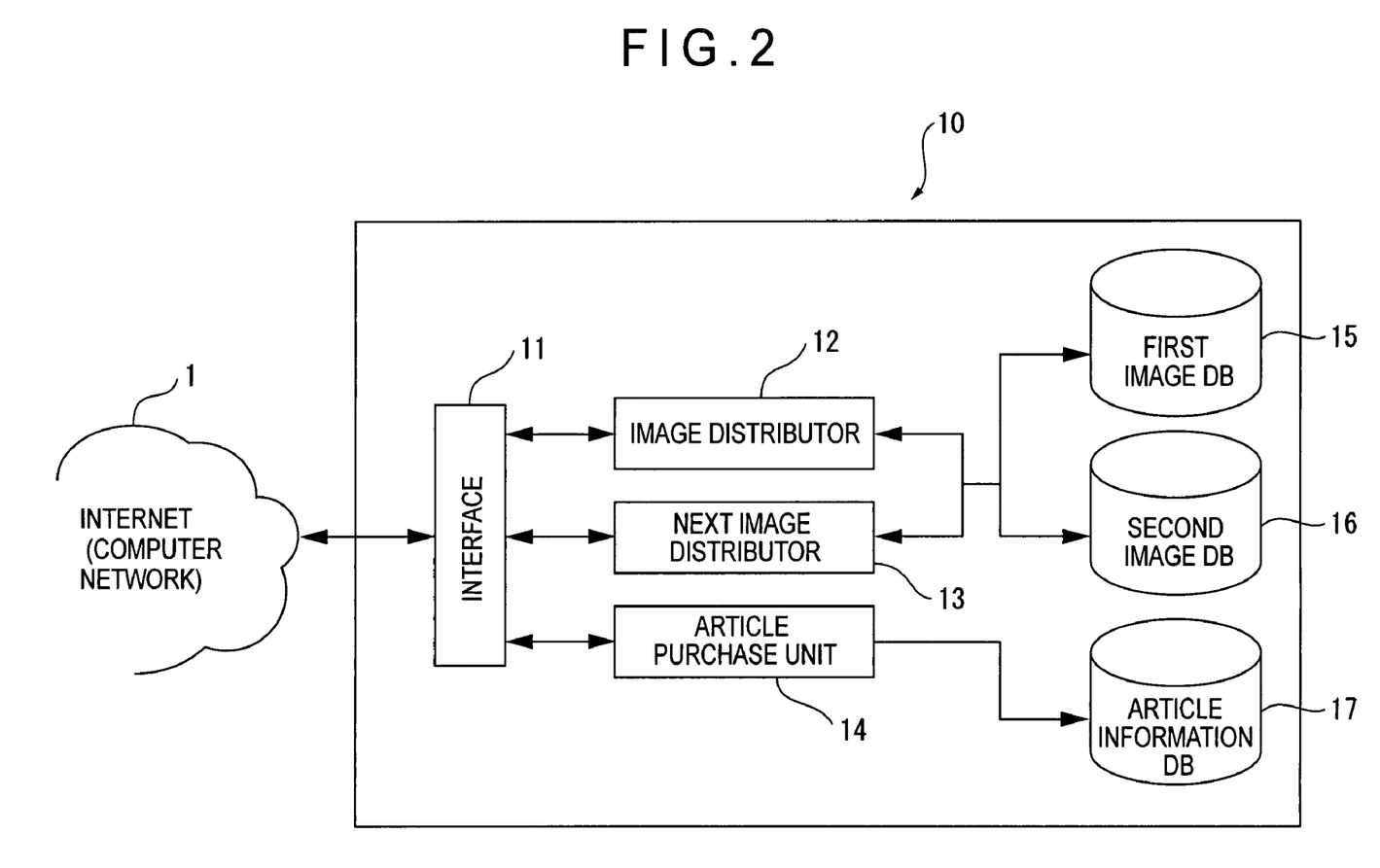
FIG. 2 is a block diagram showing a server used in the image display system.

Specifically, as shown in FIG. 2, the web server 10 includes hardware and a computer programs that operate a computer to function as an interface 11, an image distributor 12, a next image distributor 13 and an article purchase unit 14. The web server 10 further includes a first image DB (Database) 15, a second image DB 16 and an article information DB 17, which are provided in a storage of the hard disk (not shown) or the like. Note that, since other units and the like required for releasing the website are generally-known arts, a drawing and a description thereof will be omitted.

The interface 11 controls transmission/reception of data between the web server 10 and each user terminal 20, 20A, 20B, 20C through the Internet 1, and functions as data relay and command relay among the image distributor 12, the next image distributor 13 and the article purchase unit 14.

The image distributor 12 reads, in response to an image display request from each user terminal 20, 20A, 20B, 20C, requested files from the first and second image DBs 15 and 16, and then distributes the files to the user terminal 20, 20A, 20B, 20C respectively as first and second images.

Here, the first image has image data of a center spread of the electronic catalogue as a file, and since there are a plurality of center spreads in the present embodiment, there are the same number of files as the center spreads, all of the files being stored in the first image DB 15. A compression format of the image data is, for instance, a JPEG (Joint Photographic Experts Group).

Likewise, the second image also has image data of a center spread of the electronic catalogue as a file, and there are the same number of files as the center spreads, all of the files being stored in the second image DB 16. However, the compression format of the image data is, for instance, DjVu developed by LizardTech. Inc. Data amount of the file is much smaller than that of the first image compressed by the JPEG format. Further, a hyperlink (abbreviated as link in some cases) can be provided to the second image created by DjVu.

Figure 4:
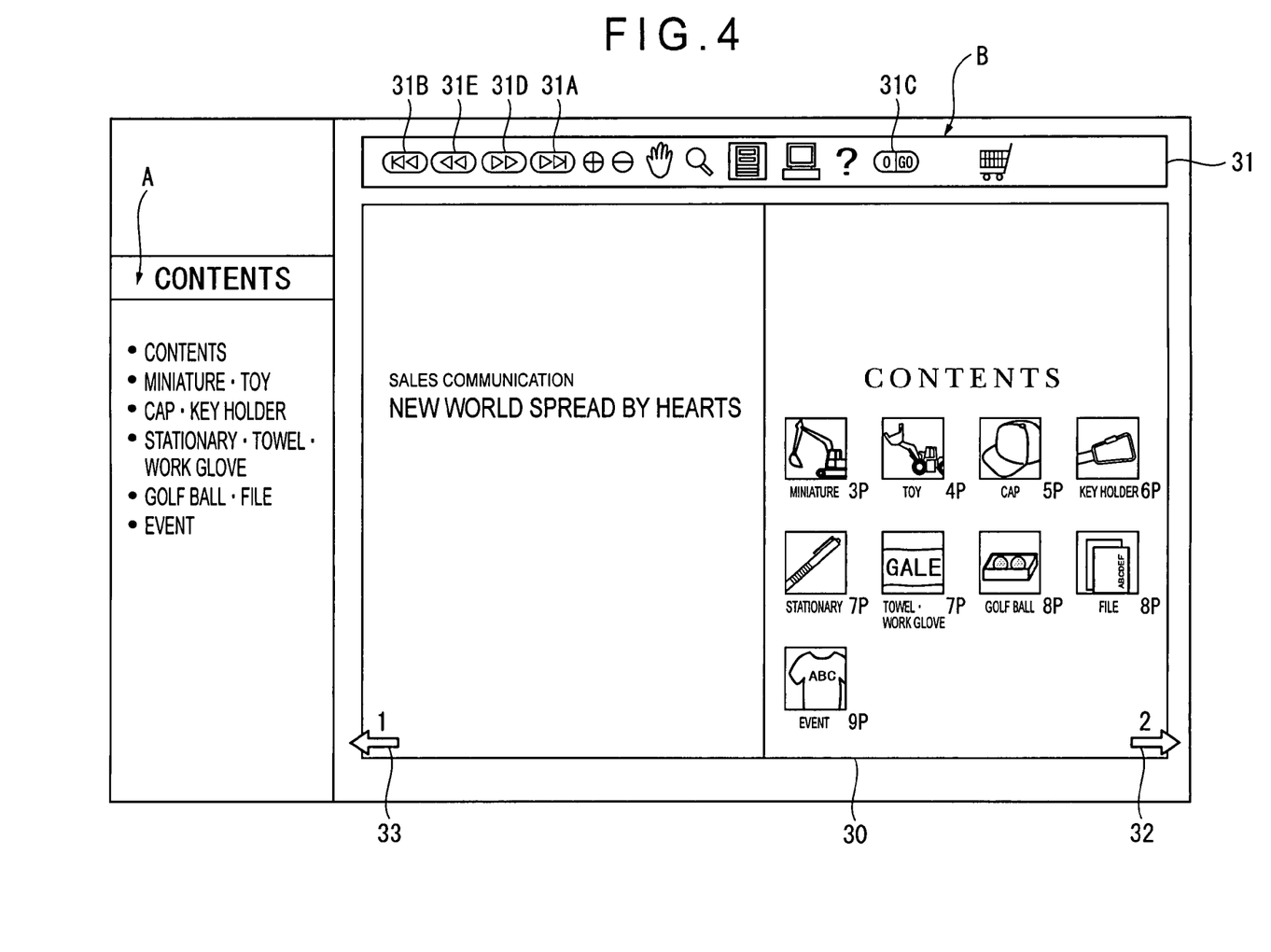
FIG. 4 is an illustration showing a first image of an electronic catalogue displayed by the image display system.

As described above, in the present embodiment, there are two files having images corresponding to a common center spread and employing different file formats (compression formats), the files being distributed as the first and second images at one time. Incidentally, a "center spread" includes left and right pages of the electronic catalogue 30, which is, for instance, the center spread including page 1 and page 2 as illustrated in FIG. 4.

The next image distributor 13 determines first and second images of a center spread, which is expected to be requested to display subsequently by the user, as next images, not the first and second images of the center spread currently requested, the next image distributor 13 outputting a command signal for distributing the next image to the image distributor 12.

For instance, when the user requests a center spread including page 3, since the center spread also includes page 4, a center spread that is expected to be desired subsequently by the user is a center spread including pages 5 and 6 or a center spread including pages 1 and 2. Thus, when the center spread including page 3 is requested to display, in addition to the first and second images of the center spread including pages 3 and 4, those of the center spread including pages 5 and 6 and those of the center spread including pages 1 and 2 are respectively determined to be the next images, and a command signal for distributing the next images is output to the image distributor 12.

However, when successive center spreads are requested to display, like in a case where the center spread including pages 5 and 6 is requested subsequently to the center spread including pages 3 and 4, the first and second images of the center spread including the third and fourth images as a previous center spread have already been distributed, which is determined by the next image distributor 13. As a result, the next image distributor 13 only requests first and second images corresponding to a center spread including pages 7 and 8 as next images. As described above, the next image distributor 13 also has a function for determining the center spread that has already been distributed so as not to request to distribute first and second images of the distributed center spread.

The article purchase unit 14 has a function for distributing a so-called shopping cart (FIG. 9) generally used in online shopping to be displayed on each user terminal 20, 20A, 20B, 20C and a function for performing an ordering process for an article selected by the user from the electronic catalogue 30 selected by the user. The ordering process for the article the user decides to purchase is performed electronically for a website of a manufacturer. The selected article and an address of the website of the manufacturer and the like are structured in a data table as article information, which is stored in the article information DB 17.

Figure 3:
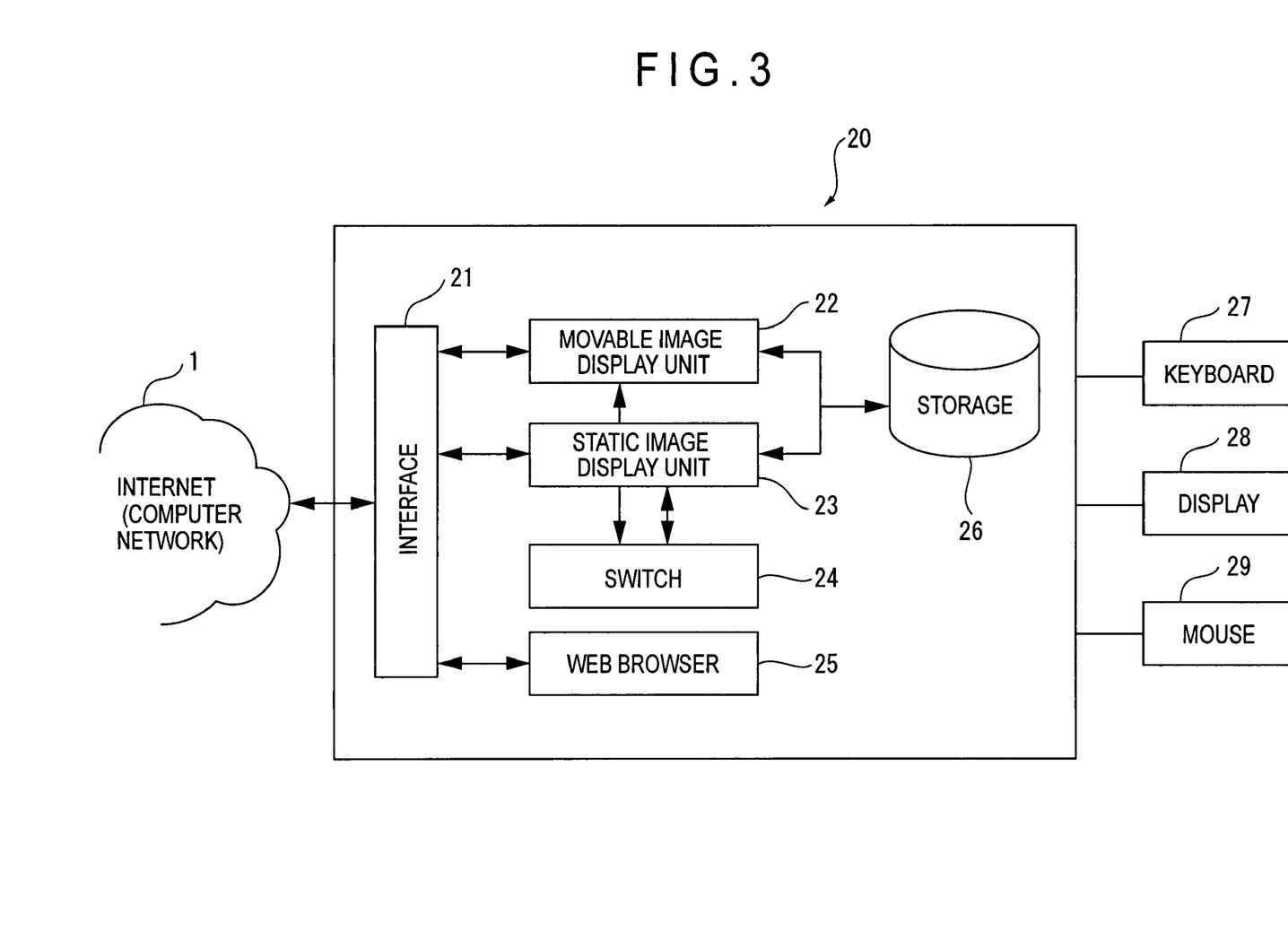
FIG. 3 is a block diagram showing a terminal used in the image display system.

Next, the user terminal 20 will be described referring to FIG. 3, the description of user terminals 20A, 20B and 20C being the same.

The user terminal 20 is constituted by a personal computer, which includes hardware and computer programs that operate the computer to function as an interface 21, a movable image display unit 22, a static image display unit 23, a switch 24 and a web browser 25. The programs are adapted to be run on an arbitrary OS (Operating System). The user terminal 20 is provided with a storage 26 such as flash memory and hard disk, a keyboard 27, a display 28 and a mouse 29.

The movable image display unit 22 has a function for movably displaying the first image distributed by the web server 10 on the display 28, which is executed by a plug-in software. As the plug-in software, Flash Player developed by Macromedia, Inc. can be exemplified. As described later, the movable image display unit 22 allows the page of the displayed first image to be turned.

The static image display unit 23 has a function for statically displaying the second image distributed by the web server 10 on the display 28, which is executed by a plug-in software. As the plug-in software, DjVu Browser Plug-in developed by LizardTech, Inc. can be exemplified. The static image display unit 23 allows the second image to be zoomed in and out without degrading the image quality, and further, the hyperlink provided to the second image can be used.

The switch 24 has a function for switching the first image displayed by the movable image display unit 22 and the second image displayed by the static image display unit 23. Specifically, while the first image is displayed, when the user tries to zoom in or out the display of the image or tries to execute online shopping of an article, the displayed image is switched from the first image to the second image. The display is switched to the second image in online shopping so that the link provided to the second image can be used.

[Image Display Method]

FIG. 4 shows a display window of the display 28, and a first image of a first center spread of the electronic catalogue 30 (pages 1 and 2 as indicated at the bottom corners of the electronic catalogue 30) is displayed on the window. The window is divided into a first frame A and a second frame B, and the first frame A displays CONTENTS, while the second frame B displays the electronic catalogue 30 and a tool bar 31. The CONTENTS in the first frame A is created by the ASP (Active Server Pages) function of the web server 10.

Thus, when [CONTENTS] displayed in the first frame A is selected and clicked by the mouse 29 or the like, a display request for a center spread including a [CONTENTS] page of the electronic catalogue 30 is output from the user terminal 20 to the web server 10, and the web server 10 distributes first and second images of the center spread based on the request, the first image being displayed first. The window shown in FIG. 4 is the center spread including the [CONTENTS] page of the electronic catalogue 30, which displays pages 1 and 2 of the electronic catalogue 30 as described already.

First and second images of previous and next center spreads determined by the next image distributor 13 of the web server 10, namely, first and second images of the next center spread (next page side), as the previous center spread (previous page side) does not exist in this case, are also distributed at the same time. In other words, the first and second images of the center spread including pages 3 and 4 are also distributed at the same time.

Likewise, when [MINIATURE/TOY] is selected, the center spread including pages 3 and 4 is displayed (as indicated by the reference character 3P next to MINIATURE and the reference character 4P next to TOY); when [CAP/KEY HOLDER] is selected, the center spread including pages 5 and 6 is displayed (as indicated by the reference character 5P next to CAP and the reference character 6P next to KEY HOLDER); when [STATIONARY/TOWEL/WORK GLOVES] or [GOLF BALL/FILE] is selected, the center spread including pages 7 and 8 are displayed (as indicated by the reference character 7P next to STATIONARY and TOWEL/WORK GLOVE—since they are on the same page of the catalog—and the reference character 8P next to GOLF BALL and FILE—since they are on the same page of the catalog); and when [EVENT] is selected, a center spread including page 9 is displayed (as indicated by the reference character 9P next to EVENT).

Note that, a center spread including a predetermined page can be displayed also by a skip-forward button 31A and a skip-back button 31B of the tool bar 31. Clicking the skip-forward button 31A allows a skip to a center spread including the last page, while clicking the skip-back button 31B allows a skip to the center spread including pages 1 and 2 from an arbitrary page, causing the respective pages to be displayed.

In addition, clicking a go-to-page button 31C of the tool bar 31 allows a jump to a center spread including an arbitrary page. The user inputs and specifies a page he/she desires to view into the button and clicks [GO]. Thereby, a center spread including the desired page is displayed.

Figure 5:
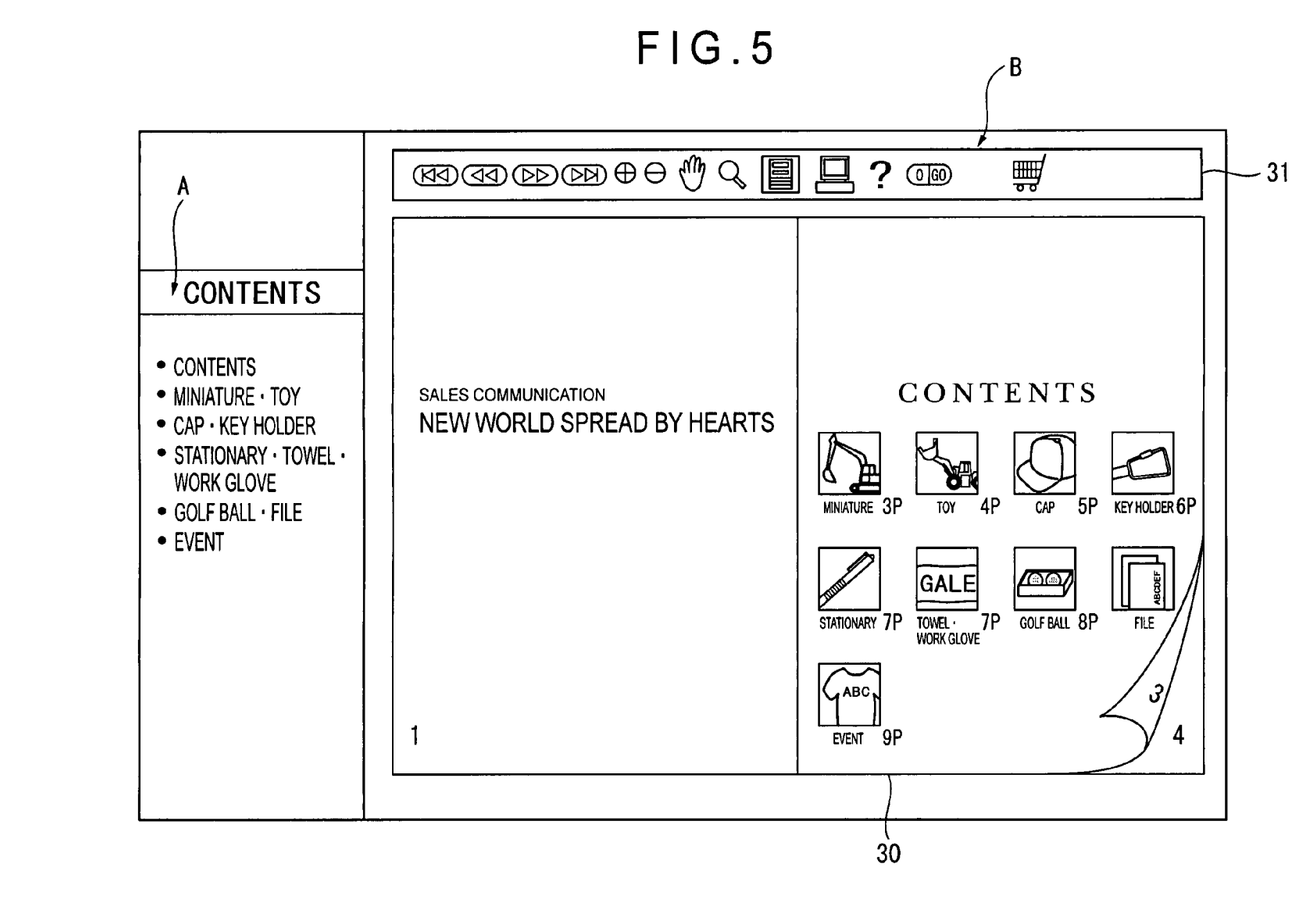
FIG. 5 is an illustration showing how to turn a page of the electronic catalogue.
Figure 6:
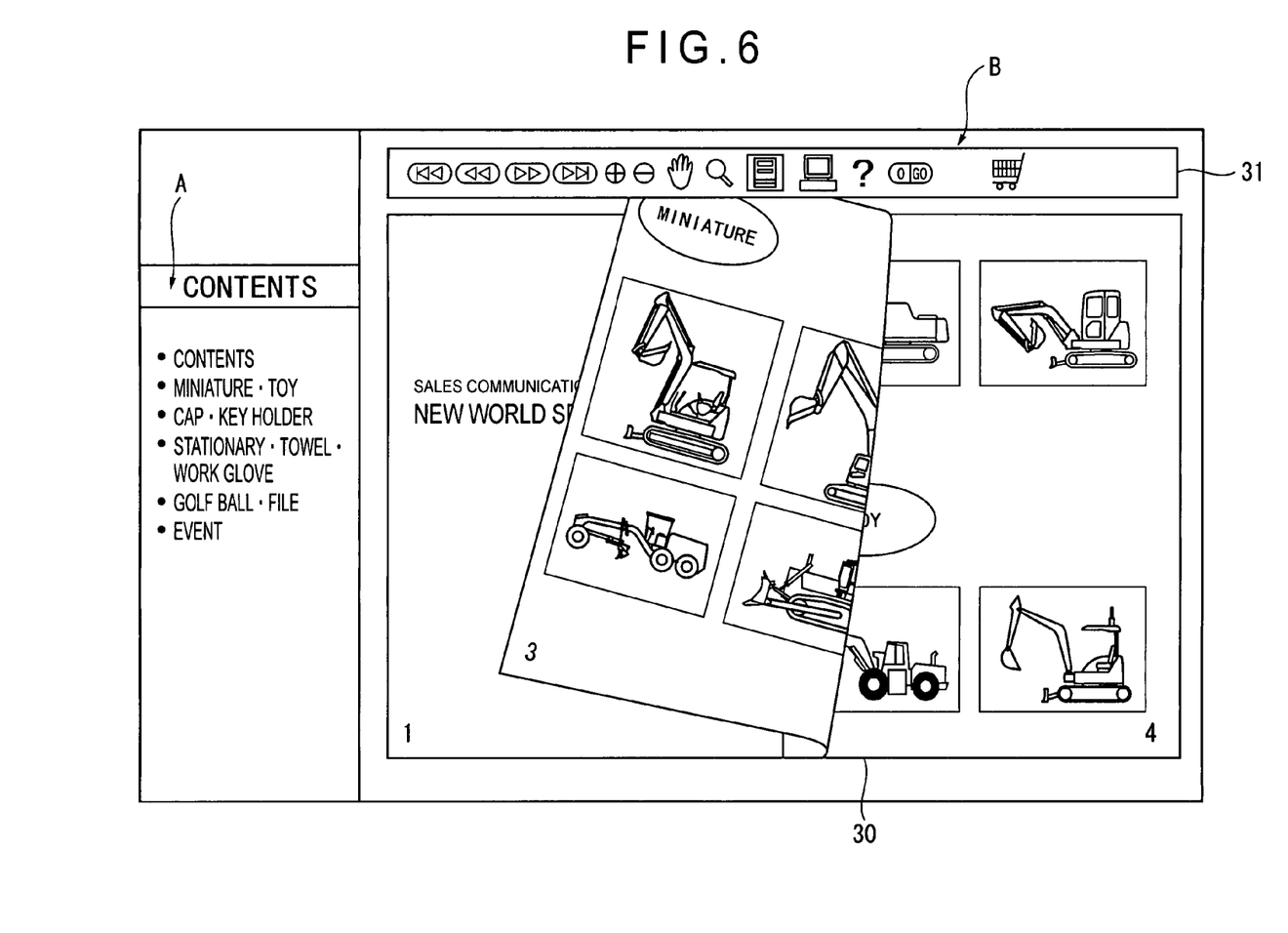
FIG. 6 is another illustration showing how to turn the page of the electronic catalogue.
Figure 7:
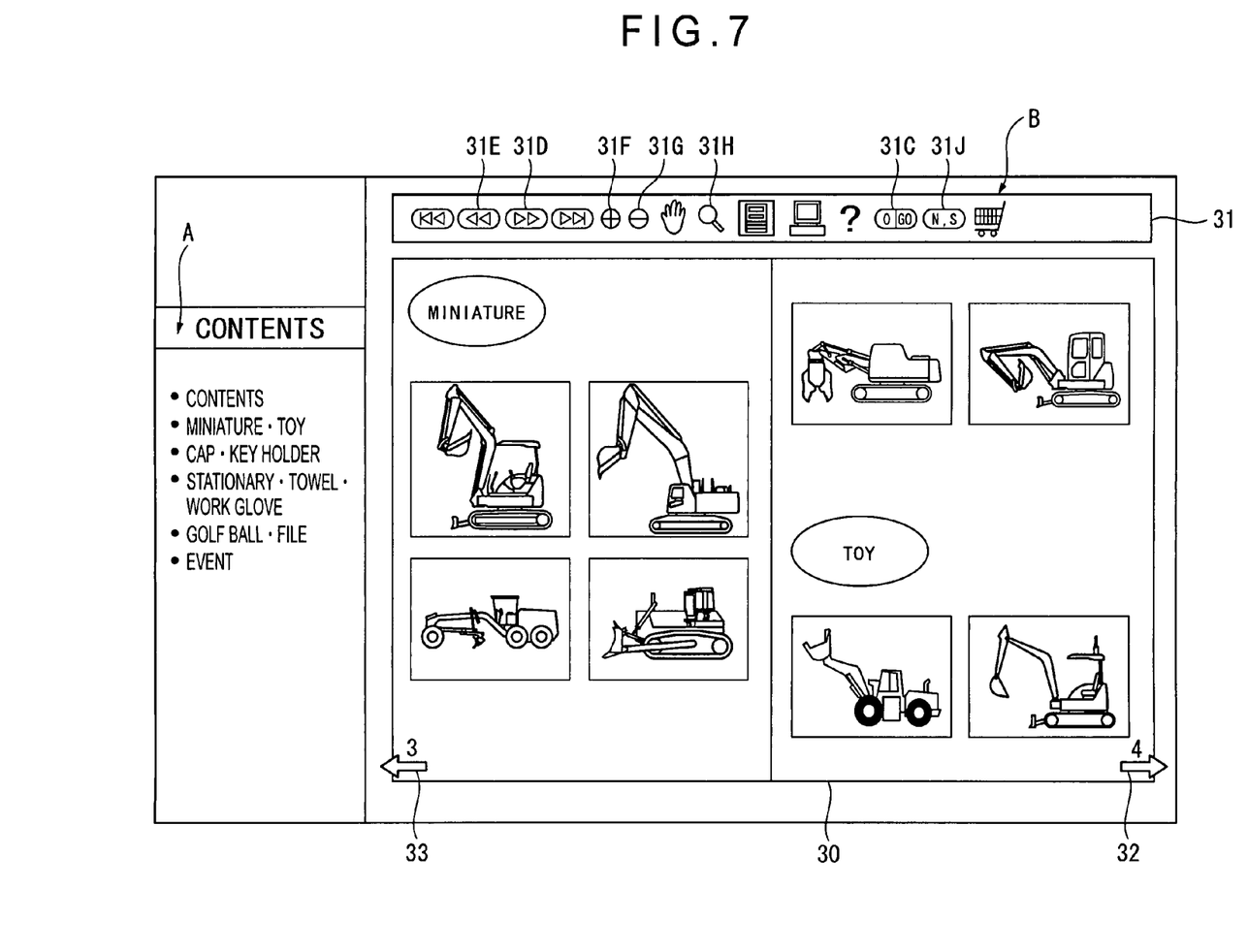
FIG. 7 is an illustration showing a first image of the electronic catalogue after turning the page.

Next, while the first image is displayed, by clicking arrow buttons 32, 33 indicated at the bottom corners of the second frame B, a page-turning function can be executed. For instance, when the arrow button 32 for a next page is clicked, page 2 is started to be turned and page 3 gradually becomes viewable as shown in FIGS. 5 and 6, the page is gradually turned just like leafing a real catalogue, and the center spread including pages 3 and 4 is displayed as shown in FIG. 7. This center spread is also the first image.

The new center spread is an image that has already been distributed from the web server 10 at the time of the center spread including pages 1 and 2 is displayed, the image having been stored in the storage 26 of the user terminal 20. As described above, by reading the image stored in the storage 26, responsivity in displaying a new image is enhanced. When the arrow button 32 is clicked to display the center spread including pages 3 and 4, the first and second images of the center spread including pages 5 and 6 are distributed by the next image distributor 13 from the web server 10 and stored in the storage 26.

On the other hand, in a condition shown in FIG. 7, when the arrow button 33 for a previous page is clicked, a page-turning for going back to the previous page is performed, causing the first image of the center spread including pages 1 and 2 to be displayed. Herein, the first and second images of the center spread including pages 1 and 2 displayed as described above have already been distributed from the web server 10 and stored in the storage 26, the images not being newly distributed from the web server 10, but being read from the storage 26 to be displayed. The page-turning can be performed also by a next page button 31D and a previous page button 31E of the tool bar 31.

The page-turning function described above is executable in the first image displayed by the movable image display unit 22. Although the first image has the file format for being displayed movably and the data for all of the center spreads is quite large, since data amount to be transmitted at one time is controlled to be small by the image distributor 12 and the next image distributor 13 of the web server 10, the time for data transmission can be saved, so that the page can be turned to display the next center spread without causing stress to the user.

Figure 8:
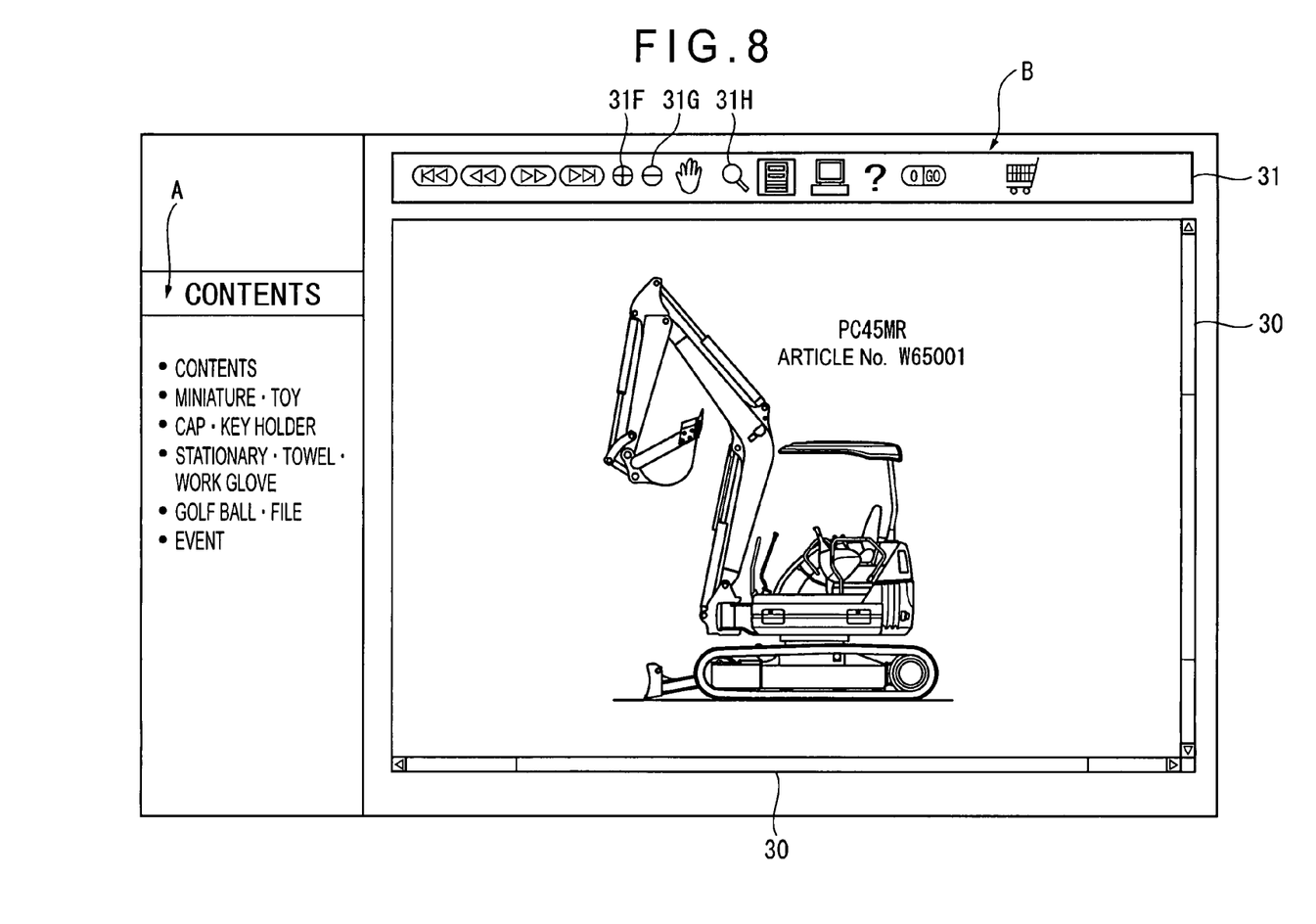
FIG. 8 is an illustration showing a second image of the electronic catalogue zoomed in by the image display system.

On the other hand, while the first image is displayed as shown in FIG. 7, by clicking a zoom-in button 31F of the tool bar 31, the window is switched to the second image quickly, and the image can be zoomed in to an arbitrary size depending on the clicking numbers as shown in FIG. 8. Since the second image has the file format assumed to be zoomed in, even when the image is zoomed in as described above, the image quality is hardly degraded, allowing characters and the like in the window to be securely read. In contrast, when a zoom-out button 31G is clicked, the second image is zoomed out to an arbitrary size depending on the clicking numbers. The zooming in or out of the image can also be performed by specifying a predetermined area of the window. In this case, a zoom button 31H is used.

Herein, the zoom-in button 31F, the zoom-out button 31G and the zoom button 31H also serve as switches for switching from the first image to the second image, and clicking the buttons 31F, 31G and 31H actuates the switch 24 to switch the images so that each of the functions can be executed.

While the second image is displayed, by clicking the arrow buttons 32, 33, the next page button 31D or the previous page button 31E, an image of another center spread corresponding to the clicking is displayed, which is always a first image. Thus, since the buttons 31D, 31E, 32 and 33 are buttons for displaying a first image of another center spread and not for switching the first image to the second image, the buttons do not serve as switches. However, though, a button for switching images from a second image to a first image in a common center spread can be provided as required, and in such case, the button serves as a switch.

[Online Shopping]

Figure 9:
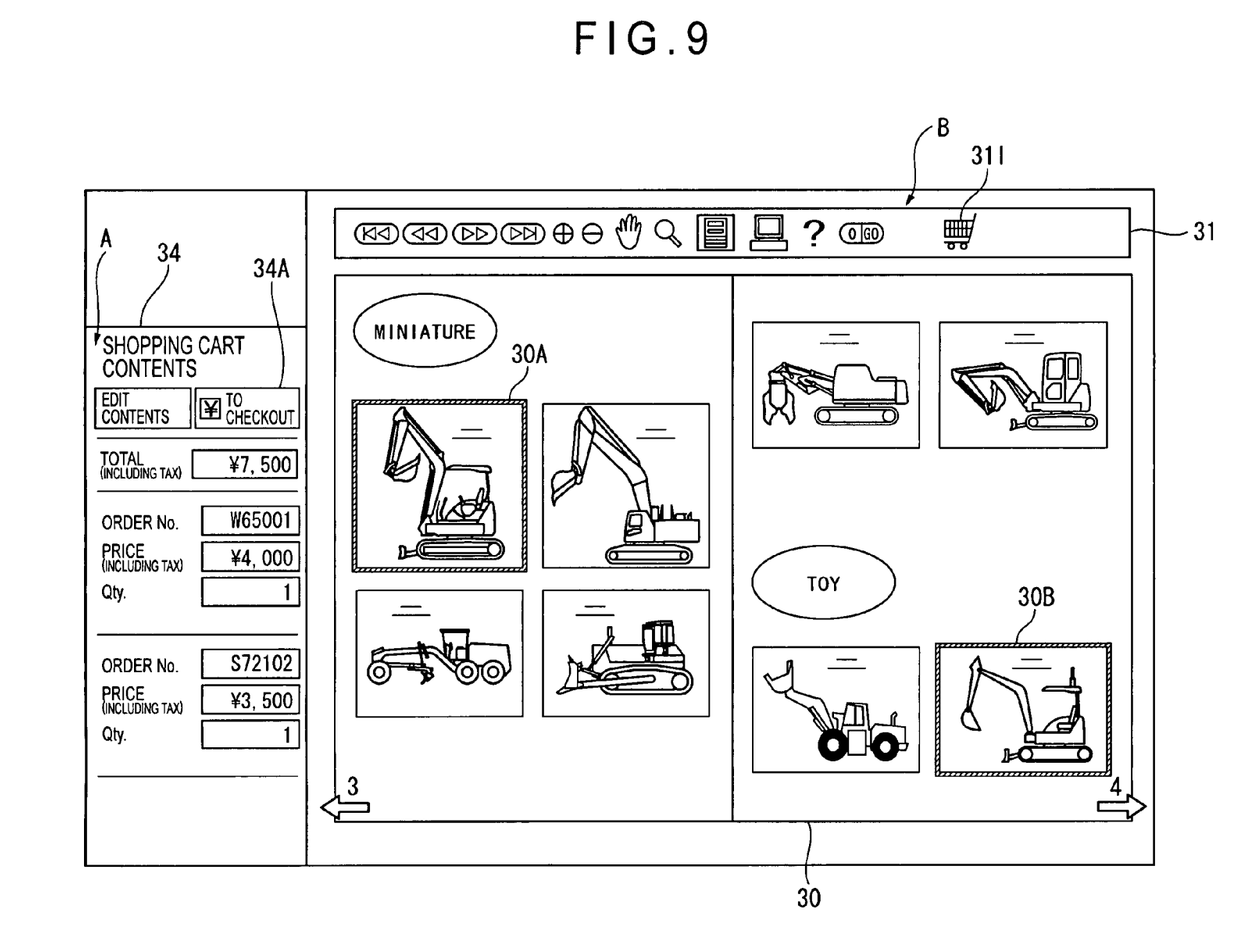
FIG. 9 is an illustration showing how online shopping is performed on the second image of the electronic catalogue.

In the present embodiment, online shopping can be performed from the second image. FIG. 9 shows the second image of the center spread (pages 3 and 4). Hyperlinks are provided to the second image, where articles 30A and 30B such as a miniature and a toy can be selected by clicking. The selected articles 30A and 30B are enclosed in shaded frames in FIG. 9. While these articles are selected, by selecting a shopping cart button 31I of the tool bar 31, the display in the first frame A is switched to a display of the content of the shopping cart 34. The shopping cart 34 is displayed by the article purchase unit 14 of the web server 10. An order number, a price, etc. of the content of the shopping cart 34 is automatically read from the article information DB 17 and displayed due to links provided to the selected articles 30A and 30B. Quantity can be input by the user arbitrarily.

Note that, in online shopping, the articles 30A and 30B cannot be clicked from the first image, the image has to be switched to the second image. Accordingly, as shown in FIG. 7, it may be so arranged that the online shopping button 31J is displayed in the tool bar 31, only when the first image is displayed, and by clicking the button 31J, the image is forcibly switched to the second image shown in FIG. 9 so that the articles 30A and 30B can be selected. When a checkout button 34A in the shopping cart 34 is clicked, a signal indicating purchase determination is transmitted to the web server 10, and subsequent processing is performed. As described above, in the present embodiment, by providing links to the electronic catalogue 30 displayed as the second image, the articles 30A and 30B can be selected directly from the electronic catalogue 30 and information of the selected articles can be promptly added to the shopping cart 34.

[Image Display Method and Steps of Online Shopping]

Figure 10:
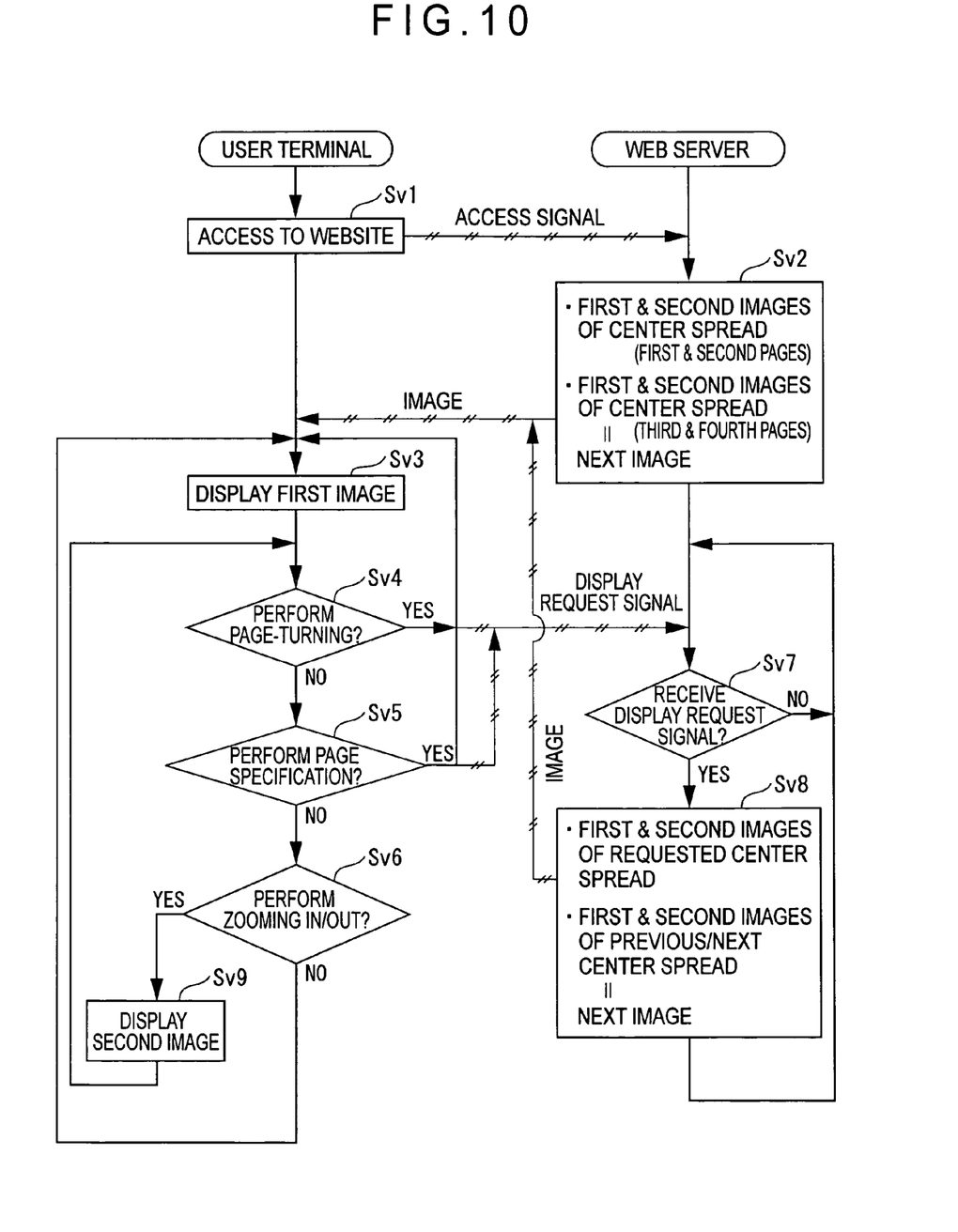
FIG. 10 is a flow chart showing a display method of the electronic catalogue.
Figure 11:
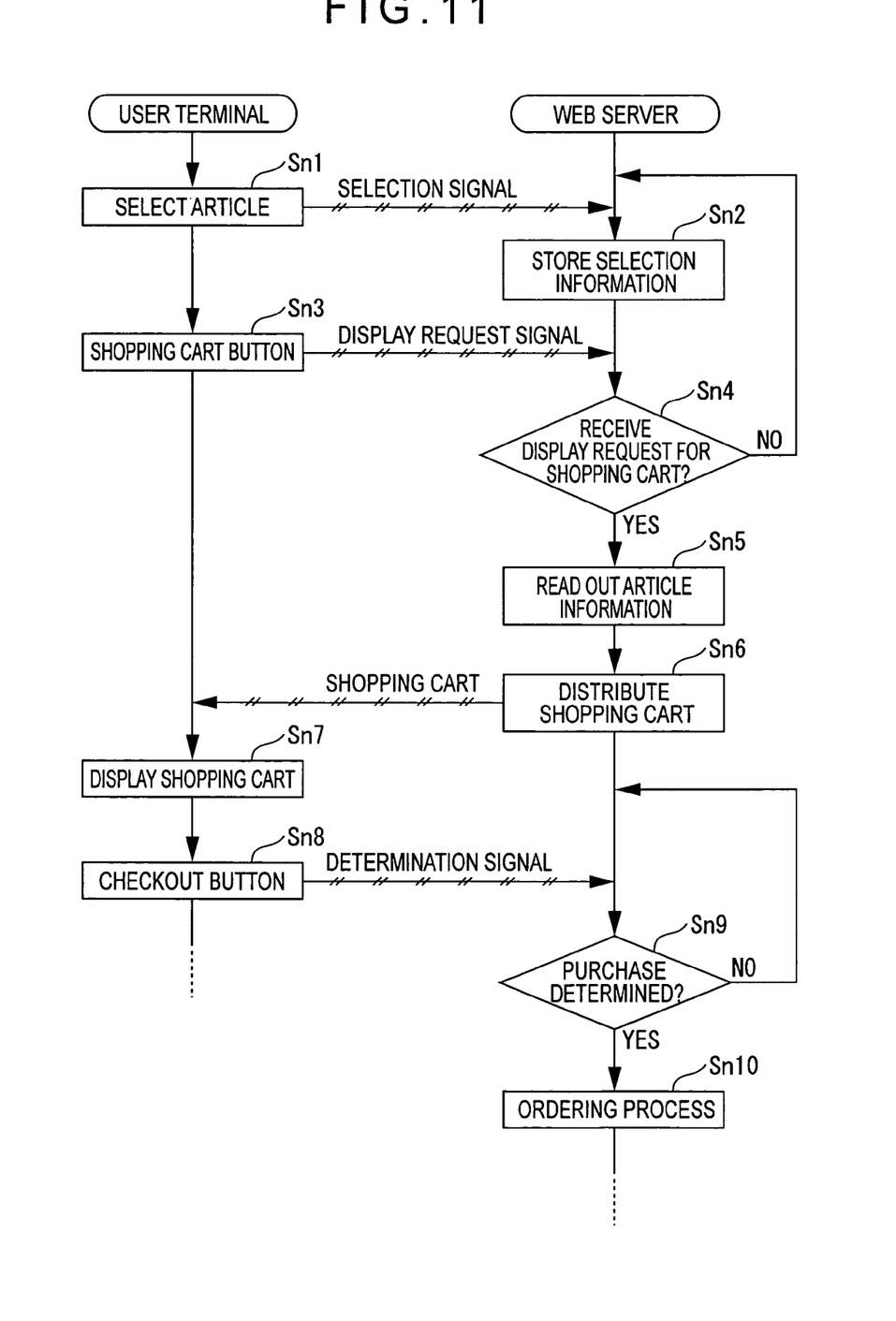
FIG. 11 is a flow chart showing steps of the online shopping.

Main operations of the image display system of the present embodiment will be briefly described below referring to flowcharts shown in FIGS. 10 and 11. FIG. 10 shows a typical flow related to the display method of the electronic catalogue 30, while FIG. 11 shows a typical flow related to steps of online shopping.

In FIG. 10, when the user accesses a website provided by the web server 10 from the user terminal 20 (Sv 1), the web server 10 distributes these first and second images of the center spread including pages 1 and 2 with the first and second images as the next image of the center spread including pages 3 and 4 at one time (Sv 2). The user terminal 20 that receives the first and second images displays the first image of the center spread including pages 1 and 2, while storing the other images in the storage 26 (Sv 3).

Next, the user terminal 20 keeps monitoring whether any of the following operations is performed: page-turning using the arrow buttons 32 and 33, the next page button 31D and the previous page button 31E; selection of the contents and specification of page using the skip-forward button 31A and the skip-back button 31B and the go-to-page button 31C; and zooming in and out of the image using the zoom-in button 31F, the zoom-out button 31G and the zoom button 31H (Sv 4 to Sv 6). When none of the above operations is performed, the step returns to Sv 3, where the same first image is continued to be displayed. Meanwhile, the web server 10 monitors a display request from the user terminal 20 based on the operations in Sv 4 and Sv 5 (Sv 7). Since the second image is stored in and read from the storage 26 of the user terminal 20 to be displayed, the display request for the second image is not output to the web server 10, which is not monitored by the web server 10.

When the page-turning or the specification of the page is performed in Sv 4 and Sv 5, the user terminal 20 transmits a display request signal to the web server 10, and the web server 10 that receives the display request signal in Sv 7 distributes first and second images of a requested center spread and first and second images of the previous/next center spreads of the requested center spread as next images (Sv 8). Only the first image of the distributed images is displayed initially on the user terminal 20 in Sv 3. On the other hand, in Sv 6, when the zooming in and out of the image is performed, the first image is switched to the second image of the common center spread to zoom in and out the image. Monitoring of a subsequent operation is continued.

In online shopping shown in FIG. 11, when an article to be purchased is selected using the mouse 29 or the like from the second image displayed on the user terminal 20, the user terminal 20 transmits a selection signal of the selected article to the web server 10 (Sn 1). The web server 10 keeps monitoring which article to be selected, and when the web server 10 receives a selection signal from the user terminal 20, the web server 10 temporarily stores the selection signals as received (Sn 2).

When the user selects an article and then clicks the shopping cart button 311, a display request signal of the shopping cart 34 is transmitted from the user terminal 20 (Sn 3). Once the web server 10 receives the signal (Sn 4), the web server 10 reads article information from the article information DB 17 based on the selection signal having been stored (Sn 5), and distributes the information along with the content of the shopping cart 34 (Sn 6) to display the distributed information on the user terminal 20 (Sn 7). When the check-out button 34A is clicked on the user terminal 20 (Sn 8), a determination signal of purchase is transmitted, and when the web server 10 that keeps monitoring receives the determination signal (Sn 9), ordering process is performed to place an order with a manufacturer or the like through the Internet (Sn 10).

Steps of online shopping should be more complicated, and there can be a situation where, for instance, a new article is selected and information of the new article is added to the shopping cart 34 even after the shopping cart 34 is displayed on the user terminal 20. However, since these steps are usually performed and well known, only a description of the simplest steps is given herein.

According to the present embodiment described above, an advantage described in Summary of the Invention can be obtained.

Since data distributed from the web server 10 to the user terminal 20 at one time is quite small as compared to that of related arts, even when the user terminal 20 is connected to the Internet through a narrowband communication line, the data can be received without any difficulty, which is securely applicable to any communication infrastructure with good usability.

Incidentally, the present invention is not limited to the embodiment described above, but includes other arrangements as long as the object of the present invention can be achieved. The following modification is also included in the present invention.

For instance, although the next image distributor 13 is included in the web server 10, such unit can be included in the user terminal 20. In such case, the user terminal 20 determines whether first and second images of a center spread that is desired to be displayed are already stored in the storage 26 or not, and if stored, the user terminal 20 reads the images from the storage 26 to display and does not transmit a display request to the web server 10.

Although the next image distributor 13 of the above-described embodiment distributes both first and second images as next images, the next image distributor 13 may be included in the present invention as long as the next image distributor can distribute at least a first image with large data amount as a next image.

Although the first and second images each are formed by an image of a center spread as a file in the above-described embodiment, a file may be formed for each page of the electronic catalogue 30 and then the files may be combined to form a center spread to be displayed.

Although an example utilizing the Internet is employed in the above-described embodiment, a network according to the present invention is not limited thereto and may be an intranet used in a company.

Although the first and second images of the electronic catalogue 30 are exemplified in the above-described embodiment, the image display system of the present invention may be applied to first and second images of a reading book or the like.

Although the best arrangement and method for implementing the present invention has been disclosed above, the present invention is not limited thereto. In other words, while the present invention has been described with reference to specific embodiment and drawings thereof, various modifications may be made to the disclosed embodiment by those of ordinary skill in the art without departing from the spirit and scope of the invention.

The priority application Number JP 2004-286665 upon which this patent application is based is hereby incorporated by reference.

What is claimed is:

1. An image display system comprising:
a server; and
a terminal connected to the server through a computer network,
the server comprising:
a first image database that stores a first image showing an electronic catalog and having a first file format for movable image display, the first image showing a plurality of articles that are not linked to a hyperlink;
a second image database that stores a second image having a same display contents as the first image and a second file format for static image display, the second image showing the same plurality of articles each of which is linked to a hyperlink;
an image distributor that, in response to an image display request from the terminal at one time, reads the first image and second image corresponding to the request from the first image database and second image database to distribute the read images, and
an article purchase unit that enables selection of an article to purchase from the first image on the terminal, the article being linked with the hyperlink in the second image, the terminal comprising:
a movable image display unit that movably displays the first image distributed from the server on a display;
a static image display unit that statically displays the second image distributed from the server on the display; and
a switch that switches between the movable image display unit and the static image display unit,
wherein the server or the terminal includes a next image distributor that determines a next image that is expected to be displayed subsequently to the first image and second image for the image display request and outputs a command signal so that at least a first image of the next image is distributed with the first image and second image for the image display request to be displayed by the movable image display unit,
wherein the terminal causes display of an online shopping button only simultaneously with the first image and not with the second image, and when the online shopping button is operated the switch of the terminal switches from displaying the first image by the movable image display unit to displaying the second image by the static image display unit but does not select the article to purchase nor place the article into a shopping cart,
wherein the article purchase unit enables the purchase of the article or placement of the article into a shopping cart when a shopping cart button is operated while the article is selected from the second image linked with the hyperlink that is switched by operating the online shopping button being displayed simultaneously with the first image, and
wherein the online shopping button is a singular button that causes switching from displaying the first image to displaying the second image that includes the same plurality of articles as the first image and also includes hyperlinks to the plurality of articles.

2. The image display system according to claim 1, wherein the next image distributor distributes both the first image and a second image of the next image.

3. An image display method for, using an image display system including a server and a terminal connected to the server through a computer network, displaying an image distributed from the server on the terminal, the method comprising a server process and a terminal process,
the server process comprising:
distributing both: a stored first image showing an electronic catalog and having a first file format for movable image display, the first image showing a plurality of articles that are not linked to a hyperlink; and a stored second image having a same display contents as the first image and stored in a second file format for static image display in response to an image display request from the terminal at one time, the second image showing the same plurality of articles each of which is linked to a hyperlink, and
enabling selection of an article to purchase from the first image on the terminal, the article being linked with the hyperlink in the second image,
the terminal process comprising:
movably displaying the first image distributed from the server on the terminal;
statically displaying the second image distributed from the server on the terminal; and
switching the movable image display and the static image display,
wherein the server or the terminal determines a next image that is expected to be displayed subsequently to the first image and second image for the image display request and outputs a command signal so that at least a first image of the next image is distributed with the first image and second image for the image display request to be displayed,
wherein the terminal process further comprises displaying an online shopping button only simultaneously with the first image and not with the second image, the online shopping button enabling the terminal to switch from displaying the first image to displaying the second image;
wherein when the online shopping button is operated, the terminal switches from displaying the first image to displaying the second image but does not select the article to purchase nor placement of the article into a shopping cart;
wherein the terminal process further comprises enabling the purchase of the article or placement of the article into a shopping cart when a shopping cart button is operated while the article is selected from the second image linked with the hyperlink that is switched by operating the online shopping button being displayed simultaneously with the first image, and
wherein the online shopping button is a singular button that causes switching from displaying the first image to displaying the second image that includes the same plurality of articles as the first image and also includes hyperlinks to the plurality of articles.

4. A computer readable medium having stored thereon an image display program for, using an image display system including a server and a terminal connected to the server through a computer network, displaying an image distributed from the server on the terminal, wherein the program operates the server to function as:
a first image database that stores a first image showing an electronic catalog and having a first file format for movable image display, the first image showing a plurality of articles that are not linked to a hyperlink;
a second image database that stores a second image having a same display contents as the first image and a second file format for static image display, the second image showing the same plurality of articles each of which is linked to a hyperlink;
an image distributor that, in response to an image display request from the terminal at one time, reads the first image and second image corresponding to the request from the first image database and second image database to distribute the read images, and an article purchase unit that enables selection of an article to purchase from the first image on the terminal, the article being linked with the hyperlink in the second image, while the program operates the terminal to function as:

a movable image display unit that movably displays the first image distributed from the server on a display;

a static image display unit that statically displays the second image distributed from the server on the display; and a switch that switches between the movable image display unit and the static image display unit, wherein the program further operates the server or the terminal to function as a next image distributor that determines a next image that is expected to be displayed subsequently to the first and second images for the image display request and outputs a command signal so that at least a first image of the next image is distributed with the first and second images for the image display request to be displayed by the movable image display unit, wherein when online shopping is to be conducted, the program further operates the terminal to display an online shopping button only simultaneously with the first image and not with the second image and to function as a switch that switches from displaying the first image by the movable image display unit to displaying the second image by the static image display unit when the online shopping button is operated, but not to cause selection of the article to purchase nor placement of the article into a shopping cart when the online shopping button is operated, wherein the program further operates the terminal to function as the article purchase unit and enable the purchase of the article or placement of the article into a shopping cart when a shopping cart button is operated while the article is selected from the second image linked with the hyperlink that is switched by operating the online shopping button being displayed simultaneously with the first image, and wherein the online shopping button is a singular button that causes switching from displaying the first image to displaying the second image that includes the same plurality of articles as the first image and also includes hyperlinks to the plurality of articles.

5. The image display system according to claim 1, wherein the first and second file formats of the first and second images, respectively, are file storage formats and differ from one another with respect to a compression format.

6. The image display system according to claim 5, wherein the compression applied to the first image to provide the first file format and the compression applied to the second image to provide the second file format result in a smaller data amount for the second image in the second file format than for the first image in the first file format.

7. The image display system according to claim 1, wherein the next image distributor distributes the first image of only the next image with the first and second images for the image display request.

8. The image display system according to claim 1, wherein the movable image display unit is arranged to movably display the first image by enabling the first image to be changed to the next image distributed with the first image which is different than the first image.

9. The image display system according to claim 2, wherein the next image distributor distributes both the first image and a second image of only the next image with the first and second images for the image display request.

10. The image display system according to claim 1, wherein the movable image display unit is arranged to movably display the first image by enabling the first image to be changed to an adjacent page of the catalog.

11. The image display method according to claim 3, wherein movably displaying the first image comprises placing an indicator on the displayed first image which when activated, causes the first image to be changed to the next image distributed with the first image which is different than the first image.

\* \* \* \* \*